US006928241B2

(12) United States Patent
Hirai (10) Patent No.: US 6,928,241 B2
(45) Date of Patent: Aug. 9, 2005

(54) AUTOFOCUS APPARATUS AND METHOD AND IMAGE SENSING APPARATUS

(75) Inventor: Shinya Hirai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/661,108

(22) Filed: Sep. 12, 2003

(65) Prior Publication Data

US 2004/0052514 A1 Mar. 18, 2004

(30) Foreign Application Priority Data

Sep. 12, 2002 (JP) ........................................ 2002-266873

(51) Int. Cl.$^7$ .............................................. G03B 13/00
(52) U.S. Cl. ...................................... 396/125; 348/356
(58) Field of Search ........................... 396/89, 125–127; 348/345, 353, 356

(56) References Cited

U.S. PATENT DOCUMENTS 6,130,417 A * 10/2000 Hashimoto ............... 250/201.2
6,721,499 B2 * 4/2004 Watanabe et al. ........... 396/127

FOREIGN PATENT DOCUMENTS

JP 2000-152064 5/2000

* cited by examiner

Primary Examiner—David M. Gray
(74) Attorney, Agent, or Firm—Morgan & Finnegan, LLP (57) ABSTRACT

An object of this invention is to provide an autofocus apparatus and method, and an image sensing apparatus capable of shortening the AF time without decreasing the AF precision even when the total number of acquired AF evaluation signals is large. To achieve this object, whether previous and current photographing conditions satisfy a predetermined requirement in photographing is determined. When the previous and current photographing conditions are determined to satisfy the predetermined requirement, a focusing state only near an in-focus position in previous photographing is detected. When the previous and current photographing conditions are determined not to satisfy the predetermined requirement, a focusing state in the object region is detected. An in-focus position is determined by detecting the focusing state, and the in-focus position and photographing conditions are stored for the next photographing. A focus lens is moved to the in-focus position to photograph.

17 Claims, 6 Drawing Sheets

BLOCK DIAGRAM SHOWING ARRANGEMENT ACCORDING TO FIRST EMBODIMENT

FIG. 1

BLOCK DIAGRAM SHOWING ARRANGEMENT ACCORDING TO FIRST EMBODIMENT

FIG. 3

TABLE SHOWING MEMORY EXAMPLE OF MEMORY UNIT 16

| | PREVIOUS PHOTOGRAPHING INFORMATION | CURRENT PHOTOGRAPHING INFORMATION |
|---|---|---|
| ZOOM POSITION | 0 (Wide) | 0 (Wide) |
| PHOTOGRAPHING TIME | 15:00:00 | 15:00:20 |
| MACRO SETTING | NON-MACRO | NON-MACRO |
| AF FRAME SETTING | FIRST FRAME | THIRD FRAME |
| BRIGHTNESS (Bv) | 5 | 6 |
| AF EVALUATION VALUE | 1000 | 1020 |

FIG. 4

VIEW SHOWING EXAMPLE OF DIVISION OF SCANNING RANGE OF FOCUS LENS ACCORDING TO SECOND EMBODIMENT

FIG. 5

FLOW CHART SHOWING PROCESSING IN AF
OPERATION ACCORDING TO SECOND EMBODIMENT

FIG. 6

GRAPH SHOWING EXAMPLE OF RELATION BETWEEN OBJECT DISTANCE CORRESPONDING TO IN-FOCUS POSITION AND AF EVALUATION SIGNAL

AUTOFOCUS APPARATUS AND METHOD AND IMAGE SENSING APPARATUS

FIELD OF THE INVENTION

The present invention relates to an autofocus apparatus, autofocus method, and image sensing apparatus and, more particularly, to shortening of a time taken for autofocus.

BACKGROUND OF THE INVENTION

Digital cameras and the like often adopt an autofocus (to be referred to as AF hereinafter) method (see Japanese Patent Laid-Open No. 2000-152064) called a TV-AF method. In this method, an object distance is calculated from the values of AF evaluation signals at points by moving the focus position within a given range. The AF evaluation signal is calculated using a BPF (Band Pass Filter) so as to increase as the lens is focused much more.

Figure 6:
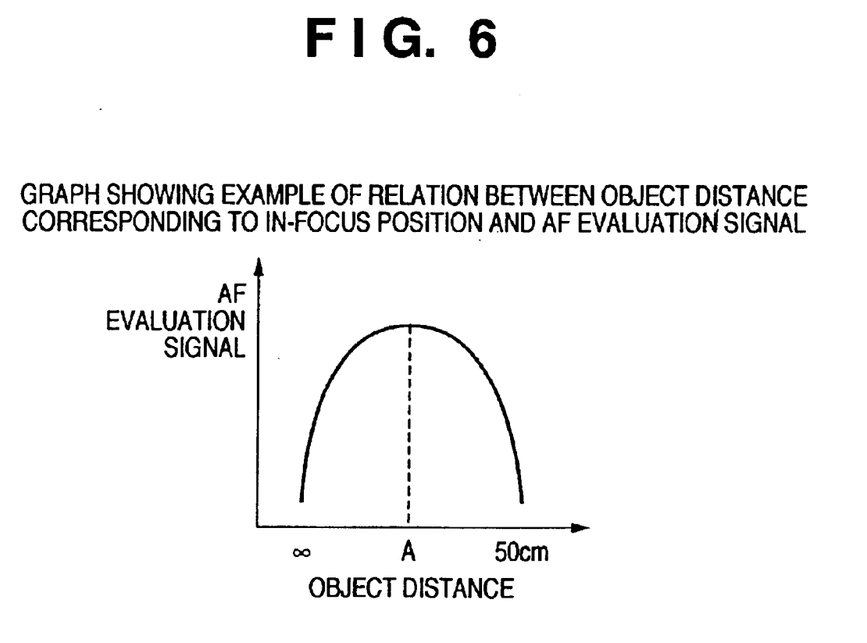
FIG. 6 is a graph showing an example of the relation between the object distance corresponding to the in-focus position and the AF evaluation value.

For example, for a distance measurement range of infinity to 50 cm, an AF evaluation signal at a focus position where the lens is focused to infinity is acquired, as shown in FIG. 6. While the focus position is sequentially moved close up to 50 cm, an AF evaluation signal at each distance is acquired. AF evaluation signals various distances are compared, and the focus position is moved to distance A where the lens is determined to be focused best, thereby controlling the focus. The abscissa in FIG. 6 represents the object distance at which the focus lens is in focus.

In general, it is difficult to successively acquire AF evaluation signals while changing the focus position. In many cases, AF evaluation signals are acquired by sampling at, e.g., a distance interval corresponding to the depth of field.

In, however, a camera having an optical system whose depth of field is shallow or a camera having a wide distance measurement range in the distance direction, even if AF evaluation signals are acquired by sampling in the above-described way, the total number of acquired data is large, resulting in a long distance measurement time.

SUMMARY OF THE INVENTION

The present invention has been made in consideration of the above situation, and has as its object to provide an autofocus apparatus and method, and an image sensing apparatus capable of shortening the AF time without decreasing the AF precision even when the total number of acquired AF evaluation signals is large.

To solve the above problems and achieve the above object, according to the first aspect of the present invention, an autofocus apparatus is comprising a first detection device which detects a focusing state by driving a focus lens in an object region, a second detection device which detects a focusing state of the focus lens only near an in-focus position in previous photographing, a memory device which stores an in-focus position and a photographing condition in photographing, and a first control device which selects the second detection device when previous and current photographing conditions satisfy a predetermined requirement in photographing, and selects the first detection device when the previous and current photographing conditions do not satisfy the predetermined requirement.

According to the second aspect of the present invention, an autofocus apparatus is comprising a second detection device which detects a focusing state of a focus lens only near an in-focus position in previous photographing, a third detection device which divides an object region into a plurality of regions and detects a focusing state of the focus lens until the focus lens can be focused in each divided region, a memory device which stores an in-focus position and a photographing condition in photographing, and a second control device which selects the second detection device when previous and current photographing conditions satisfy a predetermined requirement in photographing, and selects the third detection device when the previous and current photographing conditions do not satisfy the predetermined requirement.

According to the third aspect of the present invention, an autofocus method is comprising a step A of determining whether previous and current photographing conditions satisfy a predetermined requirement in photographing, a step B of, when the previous and current photographing conditions are determined in the step A to satisfy the predetermined requirement, detecting a focusing state only near an in-focus position in previous photographing, a step C of, when the previous and current photographing conditions are determined in the step A not to satisfy the predetermined requirement, detecting a focusing state in an object region, and a step D of, when an in-focus position is detected in the step B or the step C, photographing at the in-focus position.

According to the fourth aspect of the present invention, an autofocus method is comprising a step A of determining whether previous and current photographing conditions satisfy a predetermined requirement in photographing, a step B of, when the previous and current photographing conditions are determined in the step A to satisfy the predetermined requirement, detecting a focusing state only near an in-focus position in previous photographing, a step E of, when the previous and current photographing conditions are determined in the step A not to satisfy the predetermined requirement, dividing an object region into a plurality of regions and detecting a focusing state in each divided region, and a step F of, when an in-focus position is detected in the step B or the step E, photographing at the in-focus position.

According to the fifth aspect of the present invention, an image sensing apparatus is comprising the above autofocus apparatus.

According to the sixth aspect of the present invention, an image sensing apparatus is comprising an optical system having a focus lens, and a control device which determines whether previous and current image sensing conditions coincide with each other, on the basis of a parameter in previous image sensing operation that is stored in a memory in advance and a parameter in current image sensing operation, when the previous and current image sensing conditions are determined not to coincide with each other, scans the focus lens in a predetermined range, thereby acquiring an evaluation value representing a focusing degree, and when the previous and current image sensing conditions are determined to coincide with each other, scans the focus lens in a range which includes an in-focus position of the focus lens in previous image sensing operation that is stored in the memory in advance and is narrower than the predetermined range, thereby acquiring an evaluation value representing a focusing degree.

According to the seventh aspect of the present invention, an autofocus method is comprising determining whether previous and current image sensing conditions coincide with each other, on the basis of a parameter in previous image sensing operation that is stored in a memory in advance and a parameter in current image sensing operation, when the previous and current image sensing conditions are determined not to coincide with each other, scanning a focus lens in a predetermined range, thereby acquiring an evaluation value representing a focusing degree, and when the previous and current image sensing conditions are determined to coincide with each other, scanning the focus lens in a range which includes an in-focus position of the focus lens in previous image sensing operation that is stored in the memory in advance and is narrower than the predetermined range, thereby acquiring an evaluation value representing a focusing degree.

According to the eighth aspect of the present invention, a program is causing a computer to execute the above autofocus method.

According to the ninth aspect of the present invention, a storage medium is computer-readably storing the above program.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Preferred embodiments of the present invention will be described in more detail by exemplifying a digital camera. The present invention is not limited to the form of an apparatus, and can be practiced by the form of a method on the basis of the description of the following embodiments.
(First Embodiment)

Figure 1:
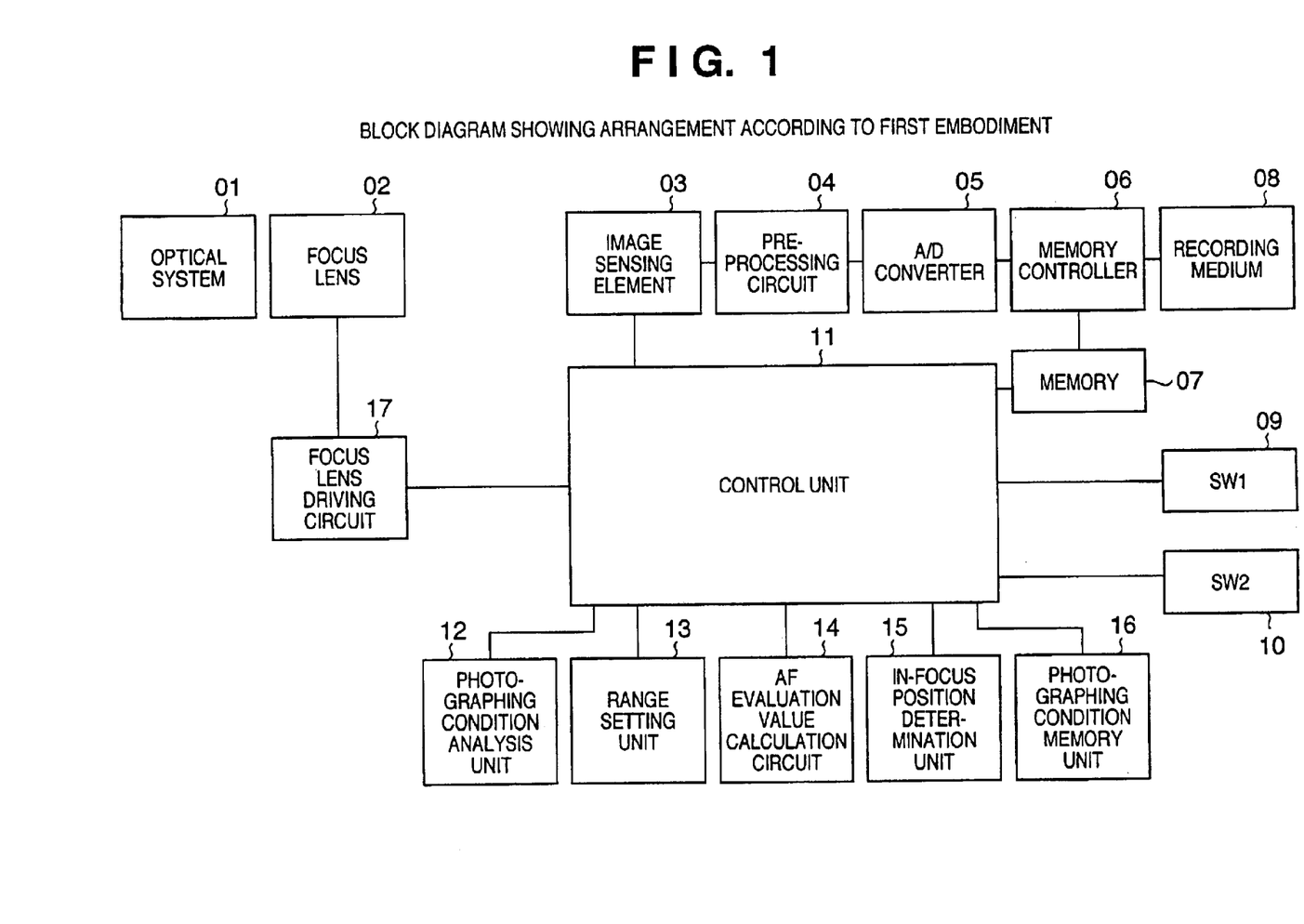
FIG. 1 is a block diagram showing an arrangement according to the first embodiment.

FIG. 1 is a block diagram showing the schematic arrangement of a "digital camera" serving as an image sensing apparatus having an autofocus apparatus according to the first embodiment.

In the digital camera, light which is imaged by an optical system 01 having a zoom lens and a focus lens 02 is photoelectrically converted by an image sensing element 03. The resultant signal is digitized via a preprocessing circuit 04 having a CDS circuit for removing output noise and a nonlinear amplifier circuit before A/D conversion, and an A/D converter 05. The digital signal is stored in a memory 07 via a memory controller 06. The signal is converted into an image by a signal processing circuit (not shown), and then the image is recorded on a recording medium 08.

AF operation will be explained. AF operation is controlled by a control unit 11. When a SW1 09 is pressed, a focus lens driving circuit 17 drives the focus lens 02 so as to scan a range selected by a photographing condition analysis unit 12 and range setting unit 13. At the same time, the focus lens driving circuit 17 acquires an image signal output from the image sensing element 03. An image signal acquired at each driving position of the focus lens 02 is converted into an AF evaluation value representing the degree of focusing by extracting intermediate- and high-frequency signal components by an AF evaluation value calculation circuit 14 using a BPF. An in-focus position determination unit 15 determines as an in-focus position a position (A in FIG. 5) where the largest AF evaluation value is obtained. The control unit 11 causes the focus lens driving circuit 17 to drive the focus lens 02 to the in-focus position. A picture is taken when the user presses a SW2 10 upon the completion of driving the focus lens 02. The in-focus position and photographing conditions in photographing are stored in a photographing condition memory unit 16.

AF operation will be explained in more detail with reference to the flow chart of FIG. 2.

In step 1 (S1 in FIG. 2; this also applies to the following steps), photographing conditions are analyzed. If the focus lens 02 is scanned for the first time, the processing advances to step 2, and the focus lens 02 is so set as to scan a predetermined range where the scanning range is relatively wide (e.g., the entire range scannable by the focus lens 02) in order to obtain AF evaluation values in a wide range. If the focus lens 02 is scanned for the second time or more upon power-on of the digital camera, whether the previous and current photographing conditions are almost the same is determined. If so, the scanning range of the focus lens 02 is set in step 2 so as to be smaller than the predetermined range and contain an in-focus position in previous photographing; otherwise, the focus lens 02 is set in step 2 so as to scan the predetermined range.

In a comparison between previous and current photographing parameters, photographing is determined to be executed under almost the same conditions when, for example, all the following conditions are satisfied (corresponding to "when a predetermined requirement is satisfied" in the appended claims).

(1) The position of the zoom lens in photographing is the same or almost the same between previous photographing and current photographing.

(2) Hardly any time difference exists between the previous photographing time and the current photographing time.

(3) The setting of a macro mode in which a close-up object is sensed or a non-macro mode in which a normal object is sensed has not been changed.

(4) The AF frame number serving as the region of image signals detected to obtain AF evaluation values has not been changed.

(5) The brightness in photographing is almost the same.

(6) The AF evaluation value is almost the same.

A condition "focusable in previous photographing" may also be added. The AF evaluation value is calculated as follows using a known method. A BPF may be applied to photographing signals, and a maximum amplitude value within the AF frame may be set as an evaluation value out of signals from which intermediate- and high-frequency signal components are extracted. Alternatively, a maximum value may be extracted along a predetermined direction in which the BPF extracts values within the AF frame, and a value calculated by integrating the maximum value in a direction perpendicular to the BPF direction may be set as an AF evaluation value. The method of calculating the AF evaluation value is not the point of the present invention, and a description thereof will be omitted.

Figure 3:
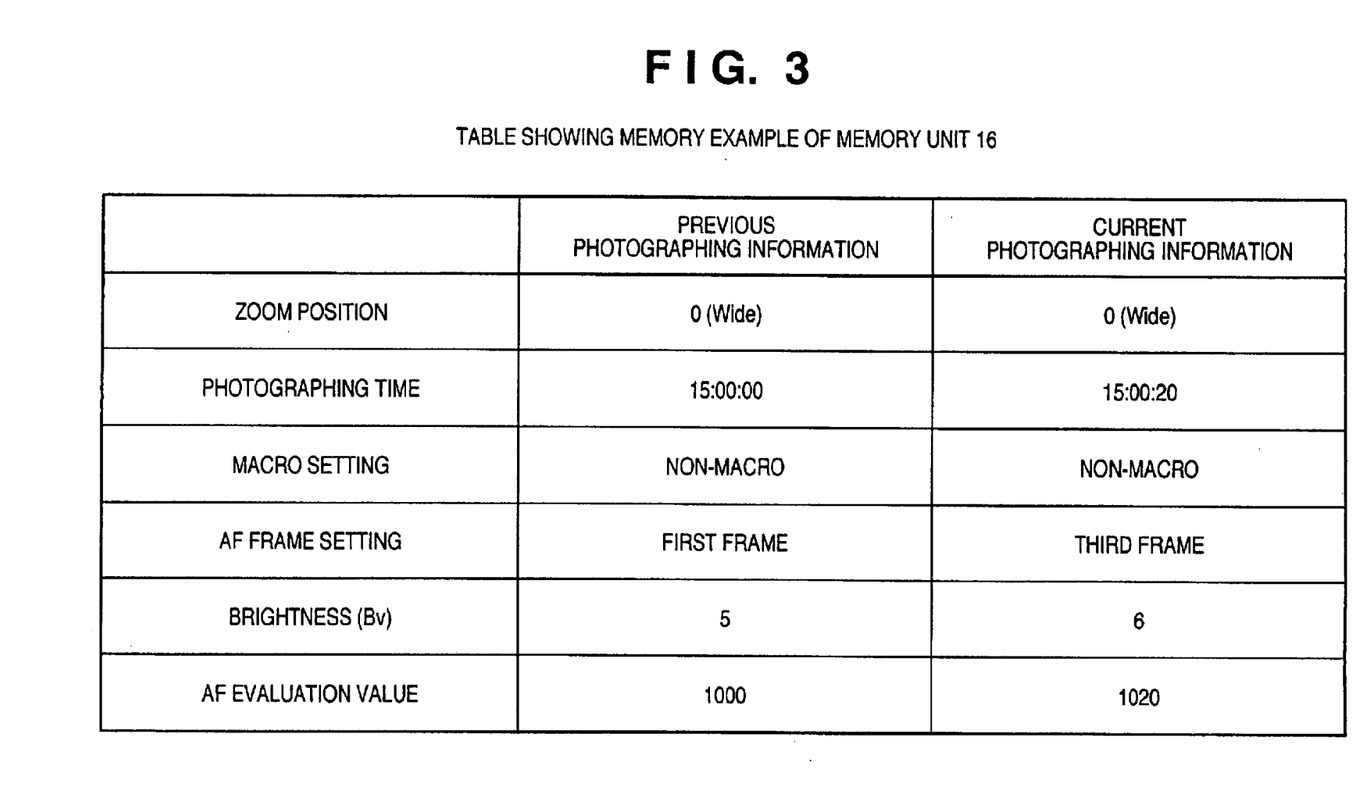
FIG. 3 is a table showing a memory example of a memory unit 16.

As a comparison method, for example, pieces of photographing information may be stored as previous information and current information in the memory unit 16, as shown in FIG. 3, and determination may be done as follows.

Photographing is regarded to be executed under similar photographing conditions if the following conditions are satisfied:

[previous photographing zoom position]=[current photographing zoom position]=[current photographing zoom position]

and [current photographing time]-[previous photographing time] <(10 sec)

and [previous macro setting]=[current macro setting]

and [previous AF frame setting]=[current AF frame setting]

and |[current brightness]-[previous brightness]|<1 (Ev)

and |[current AF evaluation value]-[previous AF evaluation value]| <300

As "almost the same conditions", the difference in white balance result may be used. For a camera capable of determining a portrait or landscape position, whether the photographing position has been changed may be used for determination. For a camera capable of moving the AF frame, whether the frame position has been moved may be used for determination. Another condition capable of specifying whether photographing conditions are almost the same may be used.

In step 3, the focus lens 02 is driven within the scanning range determined in step 2, thus obtaining an AF evaluation signal.

In step 4, an in-focus position is determined. As for determination of the in-focus position, values between AF evaluation values obtained in step 3 are calculated by interpolation calculation based on AF evaluation values obtained by scanning, and a point where the AF evaluation value maximizes is determined as an in-focus position.

In step 5, the current photographing conditions and the in-focus position obtained in step 4 are stored.

In step 6, an image signal is obtained from the image sensing element 03 in order to record the image signal on the recording medium 08. At the same time, the focus lens is driven to the in-focus position.

In this manner, AF operation is completed.

By the above-described processing, the focus lens 02 need not scan the entire scanning range for almost the same scene. An AF evaluation signal is obtained by scanning the focus lens 02 in a neighboring range where an object exists. Focusing operation can be quickly completed without decreasing the precision.

In the first embodiment, all the conditions described above must be satisfied. Alternatively, one or more conditions suffice to be satisfied.

As described above, the first embodiment can shorten the AF time without decreasing the AF precision even when the total number of acquired AF evaluation signals is large.

(Second Embodiment)

In a "digital camera" according to the second embodiment, the scanning range of the focus lens 02 in the first embodiment is divided in advance, and the divided ranges are sequentially scanned (to be referred to as divisional scanning hereinafter) to obtain AF evaluation values. The remaining part is the same, and a description thereof will be omitted.

Figure 4:
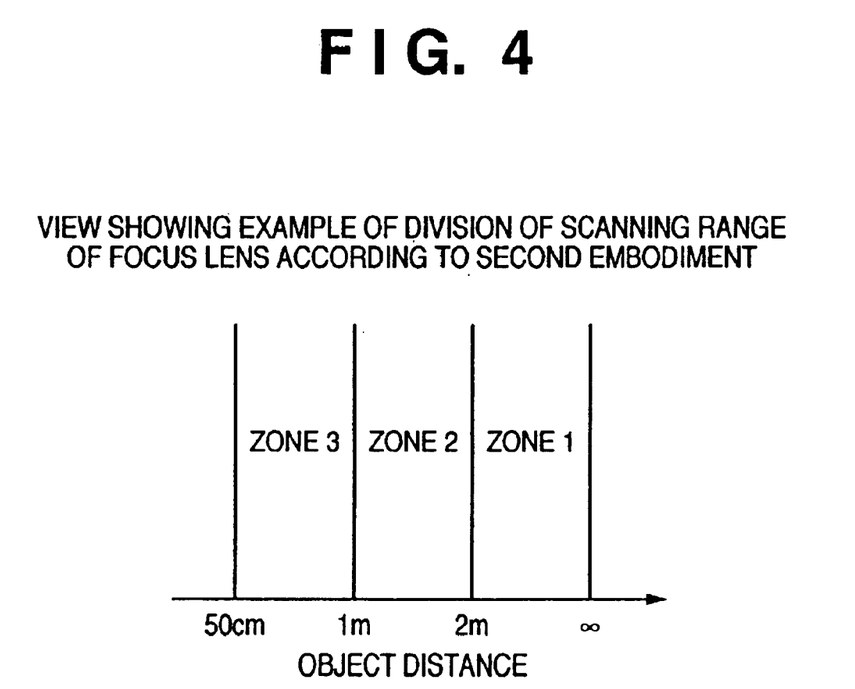
FIG. 4 is a view showing an example of division of the scanning range of a focus lens according to the second embodiment.

Divisional scanning will be explained. In the second embodiment, the scanning range of the focus lens is divided as shown in FIG. 4. In FIG. 4, the abscissa represents the position to which the focus lens is driven, and for illustrative convenience, represents an object distance corresponding to apposition where the focus lens is in focus.

Figure 5:
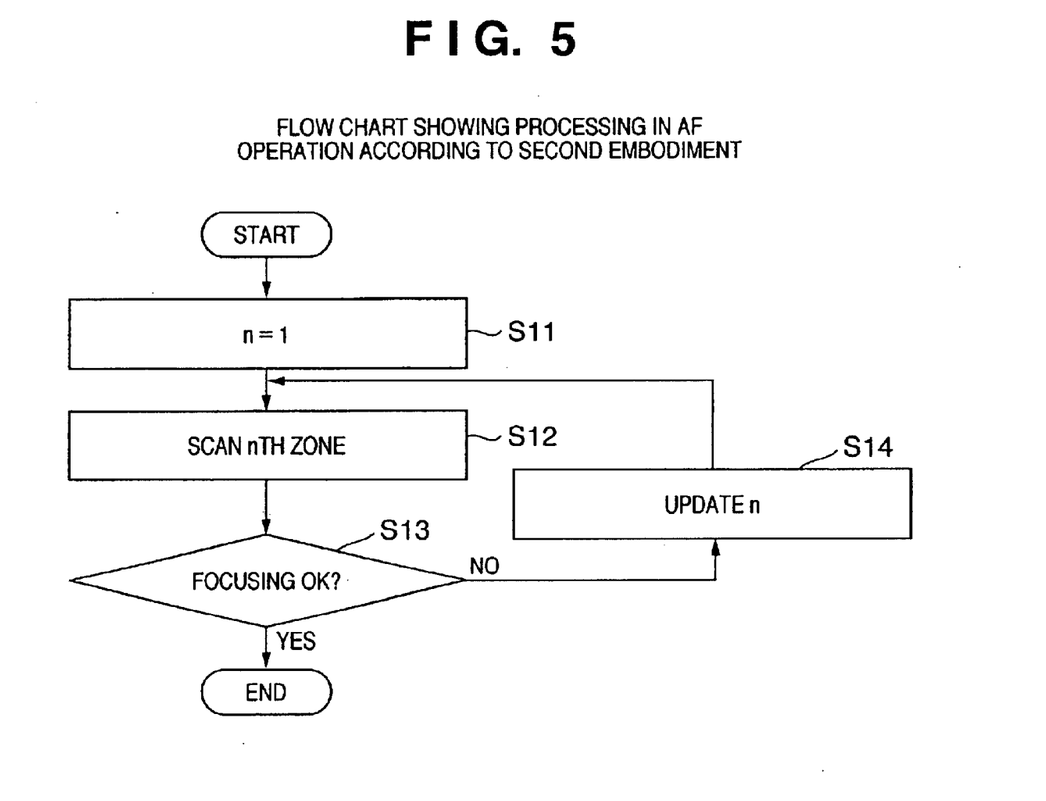
FIG. 5 is a flow chart showing processing in AF operation according to the second embodiment.

A method of scanning a divided region will be explained with reference to the flow chart of FIG. 5.

In step 11, a zone n representing a divided range to be scanned first is determined. In the second embodiment, n=1, and zones are scanned sequentially from a range (zone 1) where the focus lens is focused on a far object to a zone where the focus lens is focused on a near object.

In step 12, the nth region of the zone where the focus lens is in focus closer by one from the previously scanned zone is scanned in the divided range.

In step 13, the focusing state is determined in each zone, and if the focus lens can be in focus, the processing ends. If the focus lens cannot be in focus, the region is updated in step 14, and the processing returns to step 12.

Figure 2:
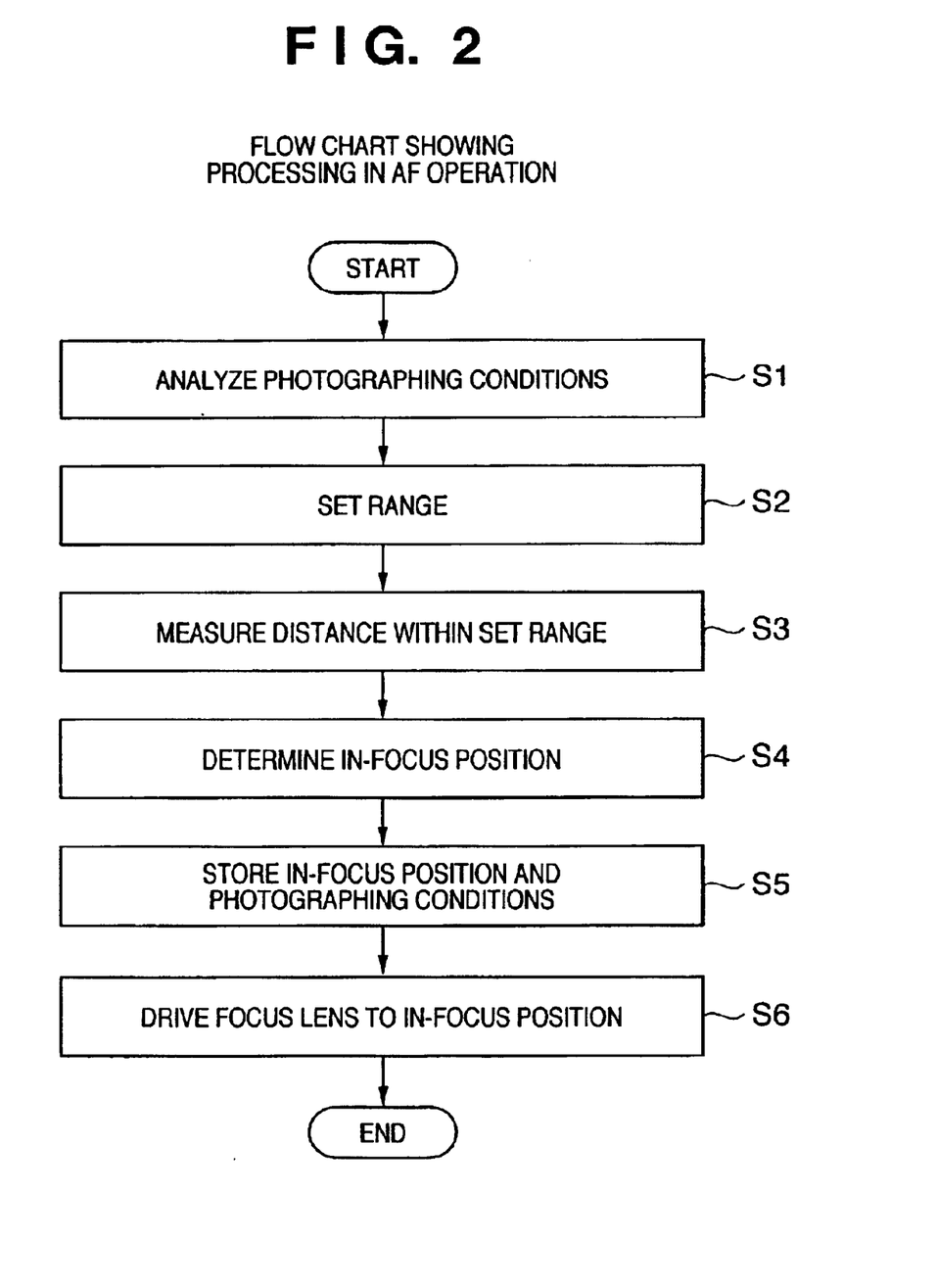
FIG. 2 is a flow chart showing processing in AF operation.

More specifically, the second embodiment adopts divisional scanning if previous and current photographing conditions are determined not to be almost the same in step 1 of FIG. 2 in the first embodiment. Note that the zone is a range wider than a range set when previous and current photographing conditions are determined to be almost the same.

In the first embodiment, whether previous and current photographing conditions are almost the same is determined, and if no, the entire range of the scanning region is scanned in step 2. In the second embodiment, a predetermined distance measurement region is divided into three, the divided regions are sequentially scanned, and scanning ends in a focusable zone. The second embodiment can shorten the AF time much more than the first embodiment.

In divisional scanning, the focus lens can be quickly focused when an object exists in a range to be scanned first. However, a long time is taken to focus the focus lens when an object exists in a range to be scanned later. From this, the distance may be measured near the previous in-focus position only when the in-focus position in previous photographing falls within a zone to be scanned later. A zone including the previous in-focus position may be scanned.

In the second embodiment, the entire scanning range is scanned in the first scanning. Alternatively, divisional scanning may be executed.

The present invention also includes a case wherein software program codes for realizing the functions of the above-described embodiments are supplied to the computer of an apparatus or system connected to various devices so as to operate the devices in order to realize the functions of the above-described embodiments, and the devices are operated in accordance with the program stored in the computer (or the CPU or MPU) of the system or apparatus.

In this case, the software program codes realize the functions of the above-described embodiments, and the program codes constitute the present invention. A device for supplying the program codes to the computer, such as a storage medium which stores the program codes, constitutes the present invention. The storage medium which stores the program codes includes a flexible disk, hard disk, optical disk, magnetooptical disk, CD-ROM, magnetic tape, nonvolatile memory card, and ROM.

The functions of the above-described embodiments are realized when the computer executes the supplied program codes. Also, when the functions of the above-described embodiments are realized by the program codes in cooperation with an OS (Operating System), another application software, or the like running on the computer, the program codes are included in the embodiments of the present invention.

Further, the present invention includes a case wherein, after the supplied program codes are stored in the memory of the function expansion board of the computer or the memory of a function expansion unit connected to the computer, the CPU of the function expansion board or function expansion unit performs part or all of actual processing on the basis of the instructions of the program codes and thereby realizes the functions of the above-described embodiments.

As has been described above, the above-described embodiments can shorten the AF time without decreasing the AF precision even when the total number of acquired AF evaluation signals is large.

As many apparently widely different embodiments of the present invention can be made without departing from the spirit and scope thereof, it is to be understood that the invention is not limited to the specific embodiments thereof except as defined in the appended claims.

What is claimed is:

1. An autofocus apparatus comprising:
   a first detection device which detects a focusing state by driving a focus lens in an object region;
   a second detection device which detects a focusing state of the focus lens only near an in-focus position in previous photographing;
   a memory device which stores an in-focus position and a photographing condition in photographing; and
   a first control device which selects said second detection device when previous and current photographing conditions satisfy a predetermined requirement in photographing, and selects said first detection when the previous and current photographic conditions do not satisfy the predetermined requirement.

2. The apparatus according to claim 1, wherein the predetermined requirement is satisfied when at least one condition capable of specifying that the previous and current photographing conditions are substantially the same exists.

3. An image apparatus comprising an autofocus apparatus comprising an autofocus apparatus defined in claim 1.

4. An autofocus apparatus comprising:
   an instruction unit which instructs an autofocus operation; and
   a control device adapted to, based on if there is a difference of a predetermined condition between an autofocus operation at a first timing and an autofocus operation at a second timing, which is different from the first timing, change a drive control of a focus lens for the autofocus operation at the second timing,
   wherein said predetermined condition includes at least a condition other than an AF evaluation.

5. The apparatus according to claim 4, further comprising:
   a detecting device which divides an object region into a plurality of regions and detects a focusing state of the focus lens until the focus lens can be focused in each divided region;
   wherein said control device controls, during when the in-focus position in the autofocus operation at the first timing falls within a divided region subjected to the detection of the detecting device, driving of the focus lens within the divided region.

6. The apparatus according to claim 5, wherein said control device so controls said detection device as to detect a divided region including the in-focus position in the autofocus operation at the first timing.

7. The apparatus according to claim 4, wherein the predetermined condition includes any one of conditions that a zoom position is substantially the same between previous photographing and current photographing, hardly and time difference exists, a photographing mode has not been changed, an AE frame setting is the same, brightness is substantially the same, an AF evaluation is substantially the same, white balance is substantially the same, and a portrait/landscape photographing position is the same.

8. An image apparatus comprising an autofocus apparatus comprising an autofocus apparatus defined in claim 4.

9. An autofocus method comprising:
   a step A of determining whether previous and current photographing conditions satisfy a predetermined requirement in photographing;
   a step B of, when the previous and current photographing conditions are determined in the step A to satisfy the predetermined requirement, detecting a focusing state only near an in-focus position in previous photographing;
   a step C of, when the previous and current photographing conditions are determined in the step A not to satisfy the predetermined requirement, detecting a focusing state in an object region; and
   a step D of, when an in-focus position is detected in the step B or the step C, photographing at the in-focus position.

10. An autofocus method comprising:
    an instruction unit which instructs an autofocus operation; and
    a control device adapted to, based on if there is a difference of a predetermined condition between an autofocus operation at a first timing and an autofocus operation at a second timing, which is different from the first timing, change a drive control of a focus lens for the autofocus operation at the second timing,
    wherein said predetermined condition includes at least a condition other than an AF evaluation.

11. An image sensing apparatus comprising:
    an optical system having a focus lens; and
    a control device which determines whether previous and current image sensing conditions coincide with each other, on the basis of a parameter in previous image sensing operation that is stored in a memory in advance and a parameter in current image sensing operation,
    when the previous and current image sensing conditions are determined not to coincide with each other, scans the focus lens in a predetermined range, thereby acquiring an evaluation value representing a focusing degree, and
    when the previous and current image sensing conditions are determined to coincide with each other, scans the focus lens in a range which includes an in-focus position of the focus lens in previous image sensing operation that is stored in the memory in advance and is narrower than the predetermined range, thereby acquiring an evaluation value representing a focusing degree.

12. The apparatus according to claim 11, wherein the predetermined range includes an entire range scannable by the focus lens.

13. The apparatus according to claim 11, wherein the predetermined range includes a range obtained by dividing a range scannable by the focus lens into a plurality of zones, and when the in-focus position of the focus lens is not determined, said control device scans the focus lens in a new zone.

14. The apparatus according to claim 11, wherein the parameter in image sensing operation includes at least one of information on a zoom lens position, photographing time, photographing mode, information on an AF frame setting, information on an object brightness, information on an AF evaluation value, information on a white balance control value, information on a portrait/landscape position of the image sensing apparatus, and information on whether the focus lens has been focused in previous image sensing operation.

15. An autofocus method comprising:

determining whether previous and current image sensing conditions coincide with each other, on the basis of a parameter in previous image sensing operation that is stored in a memory in advance and a parameter in current image sensing operation;

when the previous and current image sensing conditions are determined not to coincide with each other, scanning a focus lens in a predetermined range, thereby acquiring an evaluation value representing a focusing degree; and    when the previous and current image sensing conditions are determined to coincide with each other, scanning the focus lens in a range which includes an in-focus position on the focus lens in previous image sensing operation that is stored in the memory in advance and is narrower than the predetermined range, thereby acquiring an evaluation value representing a focusing degree.

16. A program causing a computer to execute an autofocus method defined in claim 15.

17. A storage medium computer-readably storing a program defined in claim 16.

* * * * *

UNITED STATES PATENT AND TRADEMARK OFFICE
CERTIFICATE OF CORRECTION

PATENT NO. : 6,928,241 B2
DATED : August 9, 2005
INVENTOR(S) : Hirai

It is certified that error appears in the above-identified patent and that said Letters Patent is hereby corrected as shown below:

<u>Title page, Item [54] and Column 1, lines 1 and 2,</u>
Title, should read -- AUTOFOCUS APPARATUS AND METHOD, AND IMAGE SENSING APPARATUS --.

<u>Column 5,</u>
Line 5, change "zoom position]=[current photographing zoom position]", to -- zoom position] --.

Signed and Sealed this

Third Day of January, 2006

JON W. DUDAS
*Director of the United States Patent and Trademark Office*